(12) United States Patent
Elmer

(10) Patent No.: US 6,796,091 B2
(45) Date of Patent: Sep. 28, 2004

(54) BUILDING GLASS FACADE, A METHOD FOR MOUNTING GLASS PANES IN A BUILDING GLASS FACADE, AND A CLAMPING ARRANGEMENT FOR MOUNTING GLASS PANES IN A BUILDING GLASS FACADE

(75) Inventor: Hubert Elmer, Thaur (DE)

(73) Assignee: Dorma GmbH + Co. KG, Ennepetal (DE)

( * ) Notice: Subject to any disclaimer, the term of this patent is extended or adjusted under 35 U.S.C. 154(b) by 0 days.

(21) Appl. No.: 10/036,847

(22) Filed: Dec. 21, 2001

(65) Prior Publication Data

US 2002/0178667 A1 Dec. 5, 2002

Related U.S. Application Data

(63) Continuation-in-part of application No. PCT/EP01/04255, filed on Apr. 12, 2001.

(30) Foreign Application Priority Data

Apr. 26, 2000 (DE) .......................................... 100 20 292
Jan. 12, 2001 (DE) .......................................... 101 01 517

(51) Int. Cl.[7] ................................................ E04B 2/88
(52) U.S. Cl. .................... 52/235; 52/506.05; 52/512; 411/373; 411/366.2; 403/388
(58) Field of Search ........................... 52/235, 306–308, 52/213, 506.01, 786.1, 787.1, 506.05, 512; 403/388, 389; 411/384, 373, 366.2, 353, 372.5–372.6, 166–169

(56) References Cited

U.S. PATENT DOCUMENTS 3,974,608 A 8/1976 Grearson
4,680,206 A * 7/1987 Yoxon et al. .................. 428/34
5,071,300 A 12/1991 McCauley
5,501,559 A * 3/1996 Lenherr et al. ............. 411/373
5,879,117 A * 3/1999 Chen et al. ................. 411/373
5,904,383 A * 5/1999 van der Wal ........... 292/307 B
5,997,229 A * 12/1999 Akers ........................ 411/373
6,105,319 A * 8/2000 Brunt .................... 52/204.593
6,131,346 A * 10/2000 Kordes ........................ 52/235
6,158,177 A * 12/2000 Blobaum ..................... 52/208
6,430,894 B1 * 8/2002 Chae et al. ................ 52/786.1
6,519,903 B1 * 2/2003 Dirisamer et al. ............ 52/235

FOREIGN PATENT DOCUMENTS

| DE | 3507158 | 9/1986 |
|---|---|---|
| DE | 19727200 | 1/1998 |
| DE | 19713038 | 10/1998 |
| EP | 0784129 | 7/1997 |
| EP | 972905 | * 1/2000 |
| FR | 2122057 | 7/1972 |
| GB | 1178396 | 1/1970 |
| GB | 2252141 | 7/1992 |
| WO | 9844234 | 10/1998 |

* cited by examiner

*Primary Examiner*—Winnie Yip
(74) *Attorney, Agent, or Firm*—Nils H. Ljungman & Associates

(57) ABSTRACT

A building glass facade having glass panes that are mounted to a mounting structure, such as a building. The glass panes are mounted using clamp fittings or clamping arrangements for fastening glass panes with two clamping elements that clamp the glass pane between them, whereby one clamping element is realized in the form of a conical nut or taper nut that is set into a boring of the glass pane and has a detachable cover. The invention teaches that a clip closure is integrated into the cover or is an integral part of the cover.

7 Claims, 13 Drawing Sheets

Z (10:1)

A-A

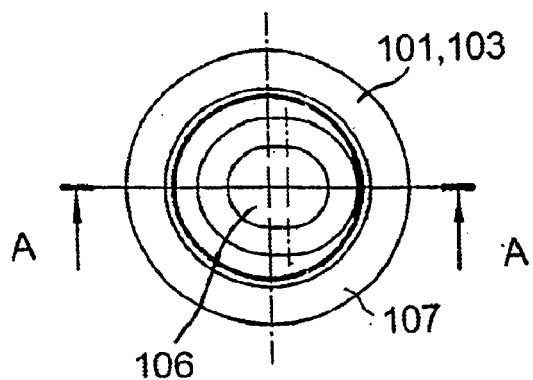
FIG. 14
FIG. 15
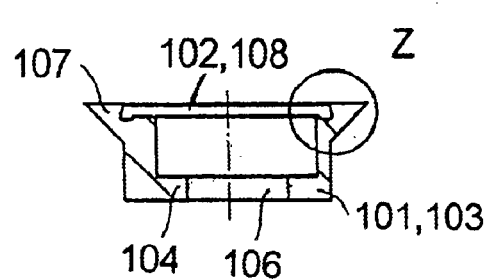
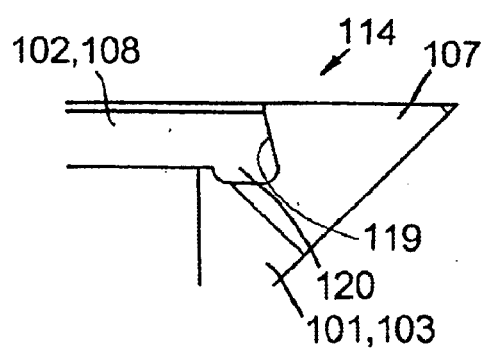
FIG. 16

BUILDING GLASS FACADE, A METHOD FOR MOUNTING GLASS PANES IN A BUILDING GLASS FACADE, AND A CLAMPING ARRANGEMENT FOR MOUNTING GLASS PANES IN A BUILDING GLASS FACADE

This application is a continuation-in-part of application Ser. No. PCT/EP01/04255 filed Apr. 12, 2001.

BACKGROUND OF THE INVENTION

1. Field of the Invention

The invention relates to glass facades for building structures and the like. Glass facades are commonly made of glass plates that are mounted to a mounting structure using clamping arrangements and are joined together to form large-area glass facades. However, because the glass panes and clamping arrangements are subject to certain manufacturing tolerances, bringing the clamping element attached to the glass plate into flush alignment with the axis of a mounting hole in a mounting structure is a common problem. If the connection between the glass plate and the clamping arrangement permits, these tolerances can be compensated for with the clamping arrangement.

This invention further relates to a clamp fitting for fastening glass panes with two clamping elements that clamp the glass pane between them, whereby one clamping element is realized in the form of a conical nut or taper nut that is set or inserted into a boring of the glass pane and has a cover, which conical nut is covered on the outside of the glass pane by a cover that is flush with the outside of the glass pane, which cover is detachably connected with the conical nut by means of a clip connector that is located on the cover.

2. Background Information

A device that represents the essential features of the prior art is described in DE 299 19 333 U1, although in that device, the conical clamping element is not realized in the form of a conical nut, but is replaced by an elastic ring, whereby between the elastic ring and the glass pane there is an elastic layer that protects the glass. A nut that forms the inner clamping element, i.e. the second clamping element, is clamped onto the threaded bolt that is connected to the substructure. The head of the threaded bolt and thus the above-mentioned conical ring are covered by a cover disc that is flush with the outside of the glass pane, is detachable, and by means of which the layer that runs through to the outside of the plane and forms the glass protection is held in place elastically.

The prior art also recites that the cover plate can be held in place by a leaf spring which is attached to it, can be flexibly engaged in a boring of the undercut recess of the ring. The prior art therefore recites a clip connector, which must additionally be attached to a flat side of the cover in the form of a leaf spring, which is engaged in a suitable manner in a boring of the undercut recess of the ring. Because for aesthetic reasons, the spring can only be located on the side of the cover facing the glass pane, it is necessary in this case to provide a corresponding open space, which is therefore unavailable for the design of the screw head of the fastening screw. This lack of space is even more restricting because in the device of the prior art, the ring itself does not—as is the case with commercially available conical nuts—fit flush with its external flange against the outside of the glass panel. On clamp fittings of the type described in DE 197 13 038 C2, the second clamping element essentially consists of a backplate, preferably in the form of an adjusting nut, that can be gripped with the conical nut, whereby the backplate can be bolted, for example, in the form of an adjusting nut, directly to the conical nut. For L-bar or angular connections and similar connections, the backplate can be formed by a pivoting clamp part which is bolted with the conical nut. Both on the above mentioned adjusting nut and on the above mentioned pivot clamp part, there can be additional fastening means, in particular fastening means used for adjustments.

In other words, a glass pane, plate, or panel can be clamped or held by a clamping element that has basically two parts. The first part of the clamping element is a hollow nut with a tapered or conical end that fits snugly in a bore or hole in the glass pane. The conical or tapered end forms a friction fit to hold the glass pane. The second part of the clamping element can be essentially any type of plate that has an opening in the center that is essentially aligned with the opening in the first part and a flange portion to clamp the glass pane. The second part is connected, fastened, bolted, or attached to the first part such that the glass pane is effectively clamped and held between the first and second parts. The second part of the clamping element could be a pivotable connection.

German Patent 197 13 038 C2 discloses a clamp fitting of the prior art in which the first clamping element is a conical nut and the second clamping element is an adjusting nut that forms the backplate. The conical nut has a cover that is connected to and forms one piece or is integral with the hollow cylindrical portion of the conical nut, whereby the hollow cylindrical portion is provided with a female thread for the connection with the adjusting nut. The adjusting nut has a slot to support the retaining flange of a fastening bolt. The installation of the conical nut and thus the connection between the conical nut and the adjusting nut is created only after the fastening bolt is tightened, in which case there is no guarantee that the adjusting nut is oriented centrally with respect to the boring of the glass pane. That necessarily results in the introduction of stresses in the glass pane when the conical nut is installed on account of the axial offset between the conical nut and the adjusting nut that forms the backplate.

DE 197 13 038 C2 discloses a clamp fitting of the prior art in which, in contrast to the device disclosed in DE 299 19 333 U1, because the cover of the conical nut is detachable, the glass pane can first be clamped free of stresses between the conical nut and the backplate, whereby a fastening screw can be tightened by means of a suitable tool through the conical nut, and if necessary through an axial passage opening of a backplate. For that purpose, the backplate can thereby have a slot or—in an angular connection, for example can be provided with a threaded hole that receives the fastening bolt.

OBJECT OF THE INVENTION

The object of the invention is to provide an opportunity for the connection of a fastening bolt to a substructure, a masonry structure, an L-bar or angular connection etc. in a manner that can resist both tension and compression stresses, in which the glass pane is clamped independently by the two clamping elements, i.e. without essentially any influence by the fastening bolt.

The object of the invention is also to realize a clamp fitting of the type described above so that when a conical nut is used, the cover that covers the head of the fastening screw is optimally located detachably on the conical nut. In particular, the space available under the cover is not restricted by the means used to achieve the detachability of the cover.

SUMMARY OF THE INVENTION

The invention teaches that this object can be accomplished by the solution disclosed in a clamp fitting for fastening glass panes with two clamping elements that clamp the glass pane between them, whereby one clamping element is realized in the form of a conical nut or taper nut that is set into a boring of the glass pane and has a cover, characterized by the fact that the cover is detachably fastened to the conical nut.

Because the cover of the conical nut is detachable, the glass pane can first be clamped between the conical nut and the backplate so that it is free of stresses, whereby, the backplate can then be tightened by means of a suitable tool through the conical nut, and if necessary through an axial passage opening of a backplate. For that purpose, the backplate can thereby have a slot or, in an angular connection, for example, can be provided with a threaded hole that accepts the fastening bolt.

The invention also teaches that the object can be accomplished in a clamp fitting for fastening glass panes with two clamping elements that clamp the glass pane between them, whereby one clamping element is realized in the form of a conical nut or taper nut that is set into a boring of the glass pane, which nut is covered on the outside of the glass pane by a cover which is flush with the outside of the glass pane, which cover is detachably connected with the conical nut by means of a clip connector which is located on the cover, characterized by the fact that the clip connector is integrated into the cover or is integral with the cover.

Accordingly, a clip closure is used, which is integrated into the cover or is integral with the cover.

The above mentioned integration into the cover eliminates the need to use clip elements that restrict the space under the cover in the vicinity of the fastening screw.

In a configuration of the clip connector that is integrated into the cover, the invention teaches that an elastic ring is located in a radially encircling outside groove of the cover, whereby the outside diameter of the ring is slightly greater than the outside diameter of the cover. This elastic ring can be realized in the form of a circlip or an O-ring, whereby when the ring is realized in the form of a circlip, the ring can consist of a plurality of straight ring segments that are oriented at an angle in relation to one another and form small nodes, so to speak, in the vicinity of their angular connections which project beyond the outside diameter of the cover. As a result, when viewed from above the periphery of the ring, there are a plurality of individual small clip connections, which make possible on one hand a reliable connection of the cover with the conical nut, and on the other hand the easy removal of the cover. An undercut groove that receives the elastic ring is located in the conical nut, and acts to a certain extent as a mating piece with said clip connector.

When the cover is realized in the form of a one-piece component, the invention teaches that the cover has, on its outside periphery, an encircling projection molded onto the cover is complementary to the undercut groove in the conical nut. As an alternative to the encircling configuration, this projection can be replaced by a plurality of projections that are complementary to the undercut groove in the conical nut.

For the realization of angular connections or pivoting connections, the invention teaches that it is advantageous, for example to achieve a fixed bearing, to realize the conical nut in the shape of a pot, and to locate a central boring in the bottom of the pot. In this case, a lateral tolerance for the compensation of the clamp fitting with respect to a substructure or similar structure is not necessary.

To form a movable bearing, on the other hand, it is advantageous if the conical nut is also realized in the shape of a pot, whereby a slot is located in the bottom of the pot, which makes possible essentially any lateral offset of the fastening bolt with respect to the clamp fitting that may be necessary. In any case, the fastening bolt can be tightened through the conical nut, i.e. through the passage opening created by the removal or absence of the cover, without introducing stresses into the conical nut or into the backplate and thus into the glass pane.

To further explain, in at least one installation method according to a possible embodiment of the present invention, the clamping element can be first attached to the glass panel. Specifically, the first part of the clamping element, which can be in the form of a conical nut, can be inserted into an opening in the glass. The shape of the conical nut can be designed to correspond to the shape of the opening in the glass, such that the tapered or conical end of the nut can fit snugly against a tapered or conical portion of the opening in the glass. The second portion or part of the clamping element can then be attached, fastened, bolted, screwed, or connected to the conical nut to clamp or hold the glass pane between the first portion and the second portion. After the clamping element has been clamped onto the glass pane, the glass pane is ready to be mounted to a building structure or other mounting structure. A user can then align the hole or holes in the glass plate with mounting holes in the mounting structure. The user can then insert a corresponding fastening bolt or mounting bolt through the holes in the glass plate, and thus the clamping element, and into the mounting holes in the mounting structure to mount the glass plate on the mounting structure. If the alignment of the glass plate is not correct, the fastening bolt may be removed to permit adjustments to be made to correct the alignment. A user can then realign the holes in the glass plate with the mounting holes in the mounting structure, and then insert the fastening bolt through the holes in the glass plate and into the mounting holes in the mounting structure to mount the glass plate on the mounting structure. After the glass plate has been properly mounted to the mounting structure, a cover piece or cap can be attached, clamped, inserted, glued, screwed, or placed onto the first part or conical nut to cover the opening in the nut. The cover piece can therefore present a continuous surface with the face of the glass pane that is facing away from the mounting structure.

In one development of the invention, after the installation, the cover can be glued or pressed onto the conical or tapered flange of the conical nut, whereby preferably for purposes of gluing, the cover is realized in the form of a flat panel, which makes it possible to manufacture the cover easily using a punching or stamping process.

The material for the cover is preferably steel or plastic, whereby when plastic is used, it becomes possible to manufacture the cover in different colors.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiments which are illustrated in the accompanying drawings, in which:

FIG. 9 is a section along Line A—A in. FIG. 8;

FIG. 14: is a plan view from overhead of an additional embodiment of a clamping element;

FIG. 15: is a cross section along Line A—A in FIG. 14;

FIG. 16: is the detail Z in FIG. 15;

FIG. 18 is a sectional view along the line A—A shown in FIG. 19;

DESCRIPTION OF THE PREFERRED EMBODIMENT

Figure 1:
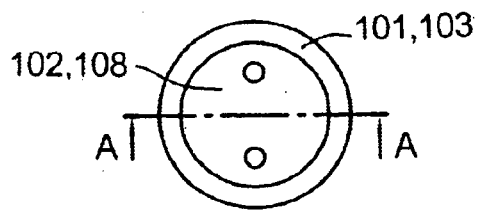
FIG. 1: is a plan view from overhead of a clamping element.
Figure 1A:
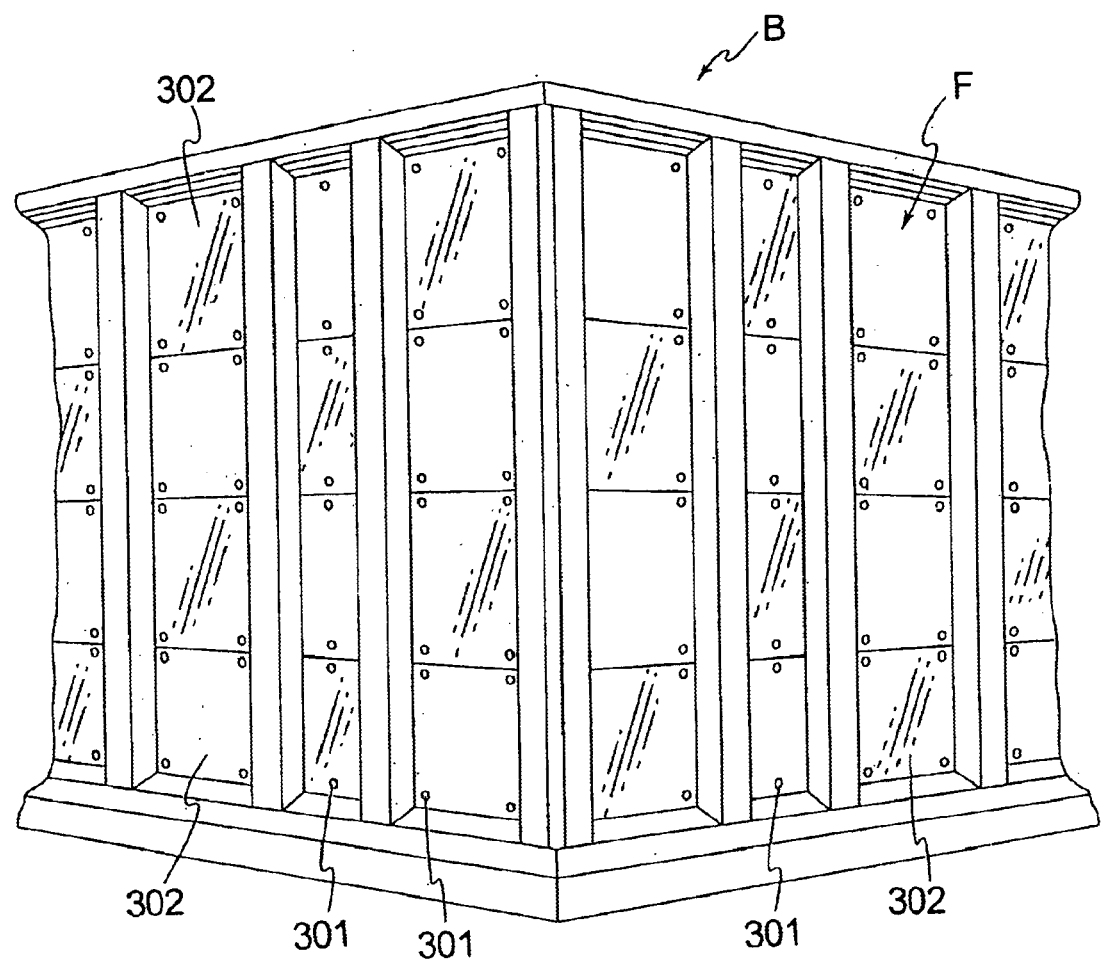
FIG. 1A: is a perspective view of a building with a facade including glass pane clamping arrangements.
Figure 6:
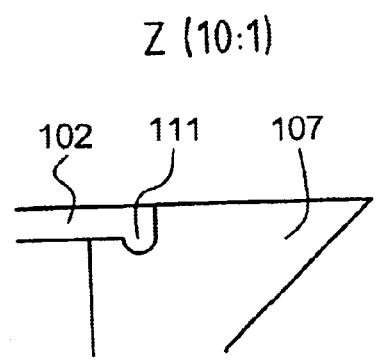
FIG. 6: is the detail Z in FIG. 5.
Figure 5:
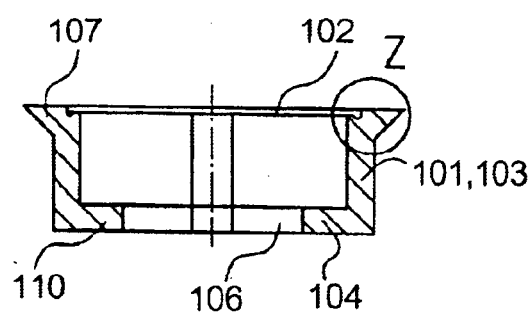
FIG. 5: is a section along Line A—A in FIG. 4.
Figure 7:
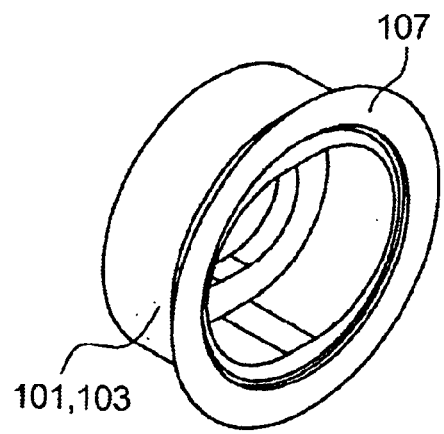
FIG. 7: is a view in perspective of the clamping element illustrated in FIGS. 4 and 5.
Figure 8:
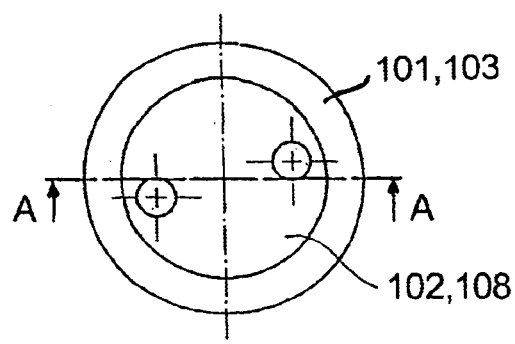
FIG. 8: is a plan view from overhead of an additional exemplary embodiment of a clamping element.
Figure 9:
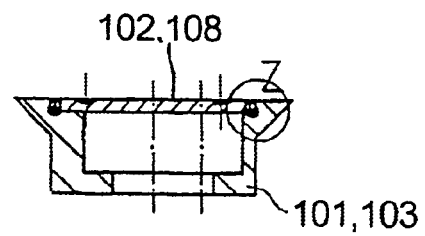
Figure 10:
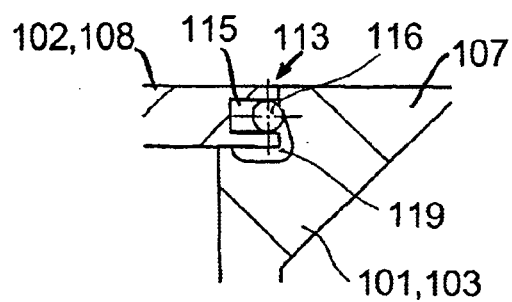
FIG. 10: is the detail Z in FIG. 9.
Figure 11:
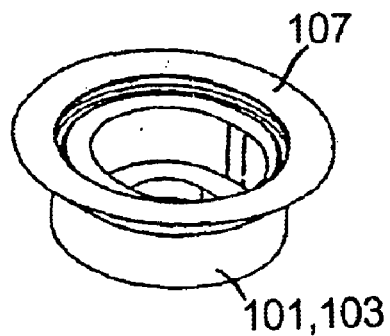
FIG. 11: is a view in perspective of the clamping element.
Figure 12:
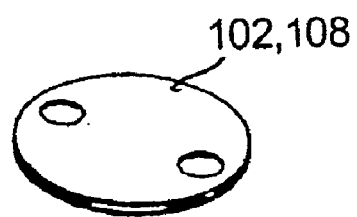
FIG. 12: is a view in perspective of the cover.

FIG. 1A is a copy of the FIG. 6 from U.S. Pat. No. 3,974,608 having the title "Panel wall construction", having the inventor Grearson, filed in the U.S. Patent Office on Oct. 23, 1975, and published on Aug. 17, 1976, from which figure copy all of the reference numerals present in the original figure, as it appears in U.S. Pat. No. 3,974,608, have been removed. U.S. Pat. No. 3,974,608 is hereby incorporated by reference as if set forth in its entirety. The reference numerals that have been removed from the figure for this U.S. Pat. No. 3,974,608, essentially reproduced herein as FIG. 1A, indicate arrangements that are well known in the prior art.

In one possible embodiment of the present invention, as illustrated in FIG. 1A, the invention is shown with a building B having a facade F with glass panels 302. The glass panels 302 are secured with glass pane clamping arrangements or fastening assemblies generally identified by reference numerals 301 which are placed in any desired pattern to suit the size of a glass panel 302.

Figure 1B:
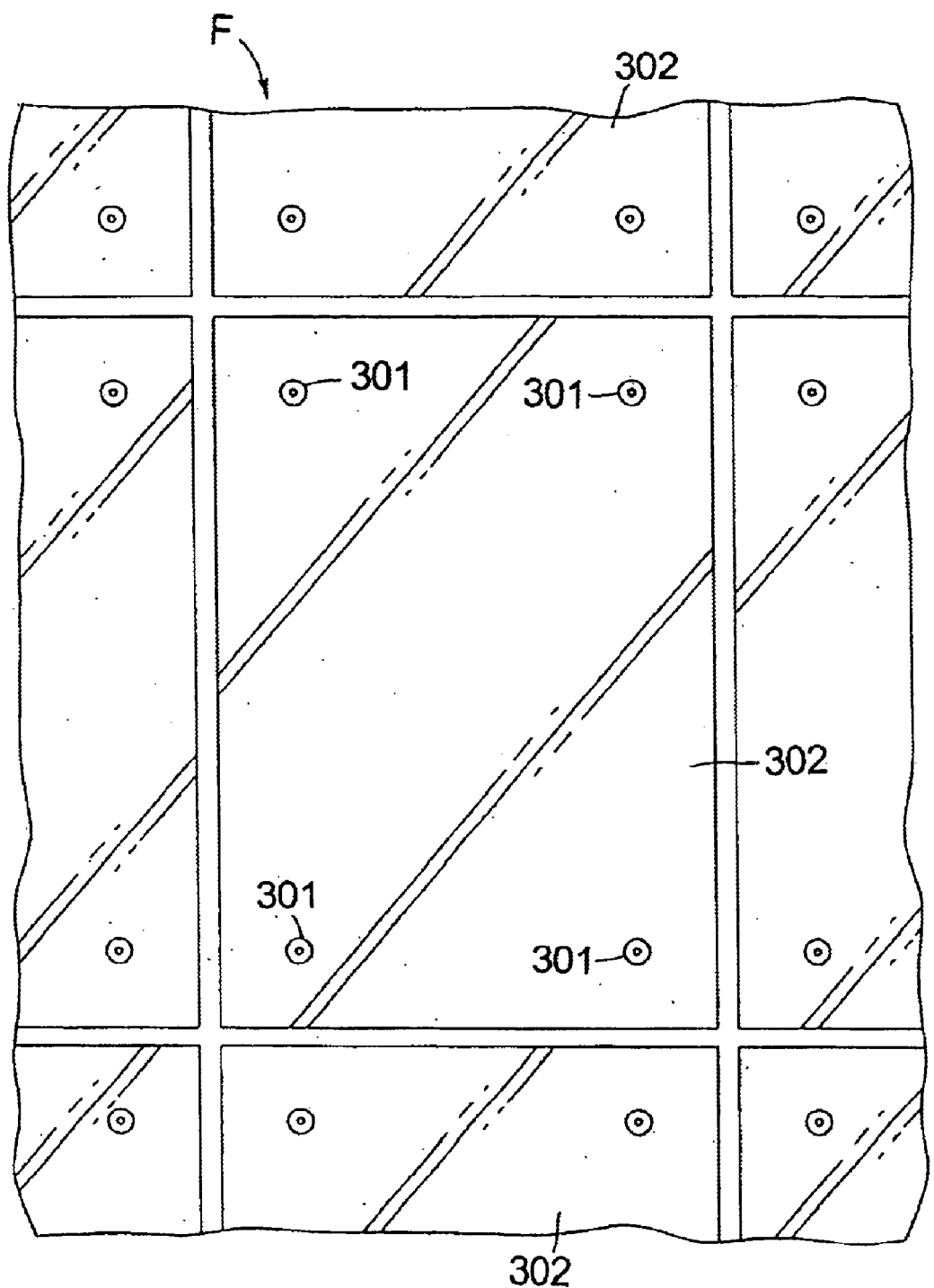
FIG. 1B: is an elevation of part of a building face with glass panes.
Figure 4:
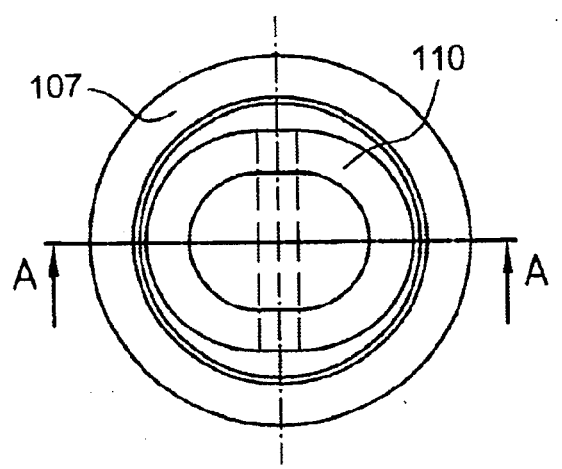
FIG. 4: is a plan view from overhead of an additional embodiment of a clamping element.

FIG. 1B is a copy of the FIG. 1 from European Patent Application No. EP 0 784 129 A1 having the title "Suspended sheet assemblies", having the inventor McCann, filed in the European Patent Office on Jan. 13, 1997, and published on Jul. 16, 1997, from which figure copy all of the reference numerals present in the original figure, as it appears in European Patent Application No. EP 0 784 129 A1, have been removed. European Patent Application EP 0 784 129 A1 is hereby incorporated by reference as if set forth in its entirety. The reference numerals that have been removed from the figure for this European Patent Application, essentially reproduced herein as FIG. 1B, indicate arrangements that are well known in the prior art.

In one possible embodiment of the present invention, illustrated in FIG. 1B, the present invention is shown with a facade F of a building in which glass panes 302 are secured with clamping arrangements or fastening assemblies 301 as will be described in greater detail below.

FIGS. 1 to 17 illustrate only one clamping element 101 which is realized in the form of a conical nut 103 which is inserted from the visible side of the glass panel into a boring in the glass panel. A backplate which can be realized in essentially any desired manner is not shown. In this regard, reference is made to the prior art as described in German Patent 197 13 038 C2.

Figure 2:
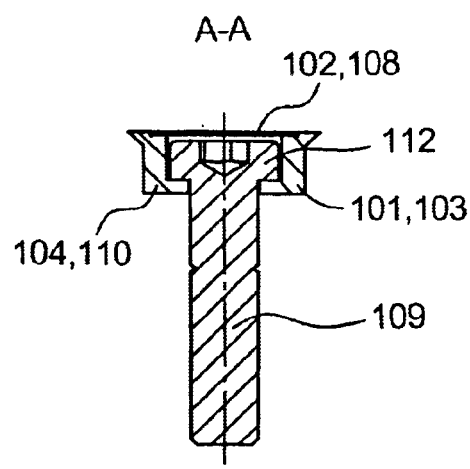
FIG. 2: is a section along Line A—A in FIG. 1.
Figure 3:
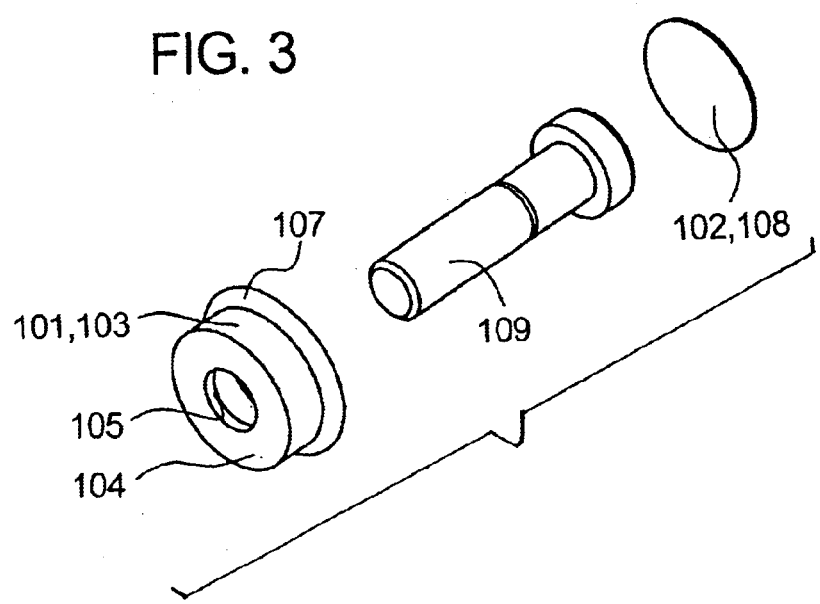
FIG. 3: is an exploded view in perspective of the clamping

In the exemplary embodiment illustrated in FIGS. 1 to 3, the clamping element 101, which is realized in the form of a conical nut 103, is penetrated by a fastening bolt 109, which is supported on a flange 110 of a the bottom 104 of the pot-shaped conical nut 103. The fastening bolt 109 can thereby be set, for example, in an L-bar or angular connection (not shown). Because the boring in the bottom 104 of the pot-shaped conical nut 103 is realized in the form of a central boring 105, the connection in question is a fixed bearing. When the cover 102 is detached, the fastening bolt 109 can be tightened using a suitable tool through the conical nut 103. The cover 102 as shown is realized in the form of a flat disc 108 which, after the installation has been completed, can be glued to the conical flange 107 in the vicinity of a conical flange 107.

In the second exemplary embodiment illustrated in FIGS. 4 to 7, in the bottom 104 of the pot-shaped conical nut, instead of the central boring 105, there is a slot 106 which makes possible a lateral displacement of the fastening bolt 109 with respect to the conical nut 103. This embodiment is a movable bearing. A bolt head 112 is thereby supported on the flange 110 of the pot bottom 104. The cover 102, as illustrated in FIG. 6, is fastened to the conical flange 107 by means of a clip connection 111.

It is apparent that in an embodiment described in German Patent 197 13 038 C2, it is possible to omit a pot bottom, if the conical nut in contrast to DE 299 19 33 U1—can be directly bolted to a backplate, whereby, however, as taught by the invention, the fastening bolt can be actuated through the conical nut on account of the detachability of the cover.

The covers 102, 108, in addition to the adhesive and clip connections, can also be provided with an O-ring, which is retained in an undercut when it is pressed into the clamping element.

Figure 13:
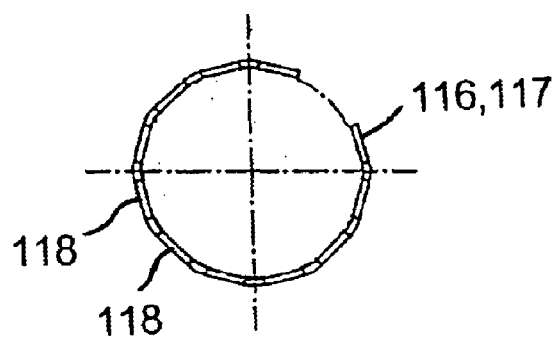
FIG. 13: is a plan view from overhead of the elastic ring.

FIGS. 8 to 13 show, in a preferred third exemplary embodiment, a clip connector 113, whereby the cover 102 has a radially encircling outer groove 115, in which an elastic ring 116 is embedded. The outside diameter of the elastic ring is thereby slightly larger than the outside diameter of the cover 102. In the vicinity of the conical flange 107 of the conical nut 103 there is an undercut groove 119, which is gripped from behind by the elastic ring 116. As shown in FIG. 13, the elastic ring 116 can be realized in the form of a circlip 117, which has straight ring segments 118 connected to one another at an angle. An additional realization consists of the configuration of the elastic ring 116 in the form of an O-ring. In the exemplary embodiment illustrated in FIGS. 8 to 13, the clip connector is integrated into the cover.

Figure 16A:
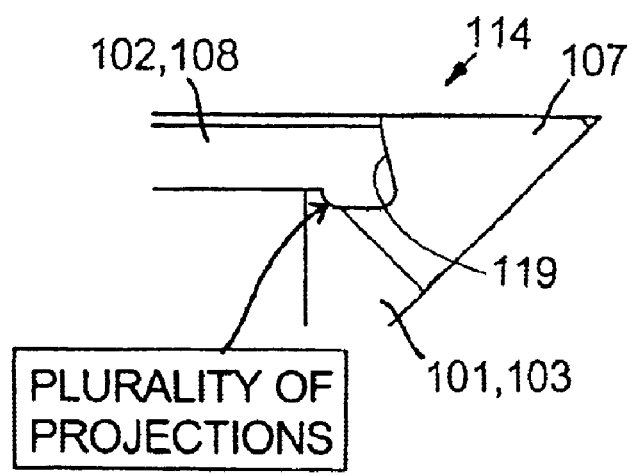
FIG. 16A: is a view similar to FIG. 16 but showing a plurality of projections.
Figure 17:
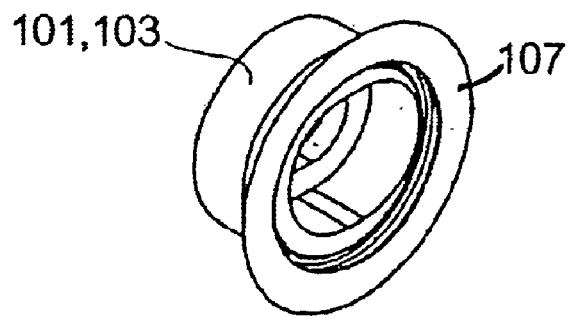
FIG. 17: is a view in perspective of the clamping element.

In the fourth embodiment illustrated in FIGS, 14, 15, 16, and 17, the clip connector 114 is formed by an encircling projection 120, which is molded in one piece on the cover 102 and is clipped into the above-mentioned undercut groove 119 in the conical nut 103 in the vicinity of the conical flange 107. In the exemplary embodiment illustrated in FIGS. 14, 15, 16, and 17, the clip connector therefore forms a component of the cover. FIG. 16A shows an alternative embodiment where the encircling projection is replaced by a plurality of projections on the outside periphery of the cover that are shaped onto the cover and are complementary to the undercut groove of the conical nut.

One feature (or aspect) of an embodiment of the invention resides broadly in a clamp fitting for fastening glass panes with two clamping elements that clamp the glass pane between them, whereby one clamping element is realized in the form of a conical nut or taper nut that is set into a boring of the glass pane and has a cover, characterized by the fact that the cover (102) is detachably fastened to the conical nut (103).

Another feature (or aspect) of an embodiment of the invention resides broadly in a clamp fitting characterized by the fact that the conical nut (103) is realized in the shape of a pot and a central boring (105) is located in the bottom (104) of the pot.

Yet another feature (or aspect) of an embodiment of the invention resides broadly in a clamp fitting characterized by the fact that the conical nut (103) is realized in the shape of a pot and a slot (108) is located in the bottom (104) of the pot.

Still another feature (or aspect) of an embodiment of the invention resides broadly in a clamp fitting characterized by the fact that the cover (102) is glued or pressed to the conical flange (107) of the conical nut (103).

A further feature (or aspect) of an embodiment of the invention resides broadly in a clamp fitting as claimed in one of the Claims 1 to 4, characterized by the fact that the cover (102) is realized in the form of a flat disc (108).

Another feature (or aspect) of an embodiment of the invention resides broadly in a clamp fitting as claimed in one of the Claims 1 to 5, characterized by the fact that the cover (102) is made of steel or plastic.

Yet another feature of an embodiment of the invention resides broadly in a method of mounting a glass pane to a mounting structure, said method comprising the steps of: determining a desired alignment and positioning of said glass pane with respect to said mounting structure; inserting a clamping nut into a corresponding hole in said glass pane, such that said clamping nut fits snugly in said hole; attaching an adjustment element having a flange portion to said clamping nut, such that said flange portion of said adjustment element and said clamping nut are clamping said glass panes on opposite sides of said glass pane; repeating said steps of inserting and attaching for at least one other hole in said glass pane; holding said glass pane against said mounting structure to verify alignment of said holes in said glass pane with corresponding mounting holes in said mounting structure; inserting a fastening bolt through said clamping nut and said adjustment element into one of said mounting holes to fasten said glass pane to said mounting structure, wherein a head of said fastening bolt is seated in a retaining portion disposed about the opening in said clamping nut; checking the alignment of said glass pane to verify if said glass pane is in the desired alignment; correcting the alignment of said glass pane to achieve the desired alignment, said correcting step comprising: removing a fastening bolt from a misaligned section of said glass pane; adjusting said adjustment element to realign said misaligned section; reinserting said fastening bolt; and repeating the steps of removing, adjusting, and reinserting as necessary until the desired alignment is achieved; and connecting a cover plate to said clamping nut to cover the opening in said clamping nut.

The present invention, in at least one possible embodiment, relates to a clamping mounting for glass plates, comprising an attachment bolt which passes through a bore in the glass plate and has a head and a barrel.

Bores in glass plates are commonly used to join glass plates to form large-area glass facades or to attach glass plates to suitable supporting elements. Because the aforementioned bores and also the fastening or connecting elements which engage in or pass through the bores are subject to certain manufacturing tolerances, bringing the bore in the glass plate into flush alignment with the axis of the fastening or clamping element is a common problem. If the connection between the glass plate and the fastening or supporting element permits, these tolerances can be compensated for with the fastening or supporting element.

German Utility Model 77 05 090 discloses a clamping mounting for all-glass structures in which a clamping rail is used to connect adjacent glass plates and in which tolerance compensation is realized by means of bores in the clamping rail of sufficient size so as to allow sufficient lateral play for the nut of the attachment bolt.

European Patent Application 0 617 190 A1 discloses a connection between two adjacent glass plates in which the clamping rail is at some distance to the glass plate and the barrel of the attachment bolt is mounted in a spherical head in the clamping rail.

U.S. Pat. No. 4,689,928 teaches a similar solution to tolerance compensation; here the socket member is located directly in the bore in the plate. To realize effective tolerance compensation, the supporting element connected to the socket element must be of a correspondingly complex design having joints which can flex relative to one another.

German Utility Model 93 18 862 teaches a method of tolerance compensation between the bores in the separate panes of a multi-pane glass plate. Relatively large diameter bores are made in the outer as well as the inner panes.

During installation, the bore surrounding the actual attachment bolt is filled with cast resin. Such large bores are aesthetically undesirable and the required use of cast resin makes installation correspondingly complex.

European Patent Application 0 506 522 B1 teaches a method of tolerance compensation in which eccentric rings which can be turned relative to one another are inserted into, and partially line, the bores in the glass plates. Installation is complex here as well, as the rings must be inserted into the bore with zero play.

German Patent No. 33 28 338 C3 discloses a device for moving a first component relative to a second component, which device could be used for connecting adjacent exterior door panels of motor vehicles, for example. Adjacent components are moved relative to one another by screwing a distance bush on which the first component is mounted into the second component. The second component is either equipped with a threaded bolt or itself forms a corresponding flange into which the distance bush can be screwed. Because at least the second component must have a flange-like prolongation, such a device is unsuitable for interconnecting glass plates or attaching glass plates to suitable supporting elements.

Finally, German Patent No. 44 36 483 A1 discloses an attachment device for attaching building panels, in which the bolt used to attach the panel is mounted in a through bore in the panel to permit spherical pivoting motion. This is realized by means of clamping jaws which are mounted flush on both sides of the panel and can be bolted together. The clamping jaws themselves have dome shaped supporting surfaces against which the bolt is indirectly propped via a cap screw which can be screwed into the bolt. Because the bolt and the elements attached thereto are mounted in the through bore in the panel so as to permit spherical pivoting motion, the bolt can pivot several degrees relative to the panel. It is obvious that the necessary pivoting motion occurs completely within the through bore in the panel and that a correspondingly large through bore is therefore required. If the through bore in the panel and the attachment bore in a wall or similar structure are misaligned as a result of construction tolerances, the bolt—and the foot of the bolt in particular—is inevitably inclined relative to the wall or similar structure, and flush contact between the foot of the bolt and the support structure cannot be guaranteed.

An additional object of the current invention, in at least one embodiment, is to permit the eccentric arrangement of an attachment bolt which extends through a bore in a glass plate so that the barrel of the attachment bolt can be precisely aligned with the connected supporting or connecting element with a minimum of effort, thus essentially ensuring easy installation. The present invention is specifically intended for such joints in which the supporting element offers no or insufficient opportunity for tolerance compensation. This can be the case when, for example, glass doors are installed in curtain walls or attached to fixed walls or similar structures, i.e. whenever the barrel of an attachment bolt must be screwed into a blind bore, a dowel, etc.

A further possible object of the current invention, in at least one embodiment, is to ensure that tolerance compensation in all planes normal to the barrel axis is possible within the bore in the glass plate. Substantially, no other loose parts, such as eccentric clamping rings, etc., are required.

These objects can be achieved in a clamping mounting which can have a clamping nut through which the barrel passes; the clamping nut can have an internal thread into which an adjusting nut for fixing the barrel can be screwed so that a retaining flange can be axially fixed between the bottom of the basin, the basin-shaped recess and the adjusting nut.

The present invention teaches that there can be a slot-like groove in which the retaining flange of the attachment bolt can be seated on that end of the adjusting nut facing the clamping nut. The floor of this groove can form a support flange for the retaining flange and can have a slot which guides, and through which passes, the barrel of the attachment bolt. The solution as claimed by the current invention substantially eliminates the need for grooves on the retaining flange integrated into the barrel. Guiding the retaining groove in the slot-like groove in the adjusting nut can make it possible to laterally displace the adjusting nut and thus the clamping nut bolted to the adjusting nut in the direction of essentially any of the four degrees of freedom by turning the adjusting nut to permit alignment with the bore in the glass plate on the one hand, and alignment with the position or orientation dictated by the barrel if the barrel has to be screwed into a dowel in a wall or a thread in a panel. The retaining flange of the barrel can be guided in the slot-like groove of the adjusting nut such that the barrel can still be moved in the direction of essentially any of the four degrees of freedom even if the glass plate is firmly clamped between the adjusting nut and the clamping nut.

In other words, in one embodiment the present invention teaches that there is a slot-like groove on that end of the adjusting nut facing the bottom of the clamping nut. The retaining flange of the attachment bolt is seated in the slot-like groove. The floor of this groove forms a support flange for the retaining flange. The floor further has a slot cut in it which guides, and through which passes, the barrel of the attachment bolt. The groove can permit the adjusting nut and thus the clamping nut to be displaced along the length of the slot. The adjusting nut can also be rotated to therefore rotate the slot. The adjusting nut can also be axially displaced with respect to the bolt. This variety of movement can permit the adjusting nut and the clamping nut bolted to it to move in essentially any of the four degrees of freedom, namely vertically, horizontally, axially, and rotationally with respect to the bolt. This freedom of motion can permit more accurate alignment with the position dictated by the barrel if the barrel has to be screwed into a dowel in a wall or a thread in a panel. The retaining flange of the barrel can be guided in the slot-like groove of the adjusting nut such that the barrel can still be moved substantially similarly to the adjusting nut as stated immediately above. The barrel can be moved relative to the adjusting nut in the direction of essentially any of the four degrees of freedom even if the glass plate is firmly clamped between the adjusting nut and the clamping nut.

In one embodiment of the present invention, it is advantageous if that side of the adjusting nut opposite the slot-like groove is realized with some means of varying the distance between the clamping mounting and a wall or similar structure. This facilitates the positioning of a glass plate during installation, in particular the flush alignment of several adjacent plates.

To achieve this, one embodiment of the present invention can have an adjusting nut with an internal thread on that side opposite the slot-like groove, into which internal thread a distance bush having a corresponding external thread and a support plate can be screwed. This embodiment is advantageous when the distance between the glass plate and a supporting element, e.g. a wall, is relatively short.

As an alternative, another embodiment of the present invention teaches that the adjusting nut has an external thread on that side opposite the slot-like groove, onto which external thread a distance nut having a corresponding internal thread and a support flange for a distance bush can be screwed for when the distance between the glass plate and a supporting element, e.g. a wall or similar structure, is relatively great.

Both of the two preceding embodiments stated immediately above teach that the adjusting nut has a dual function. First, it stays or holds or positions the retaining flange of the attachment bolt and provides the connection to the clamping nut. Second, it provides the connection to a distance bolt or distance bush, the distance between which and the adjusting nut can vary.

Figure 18:
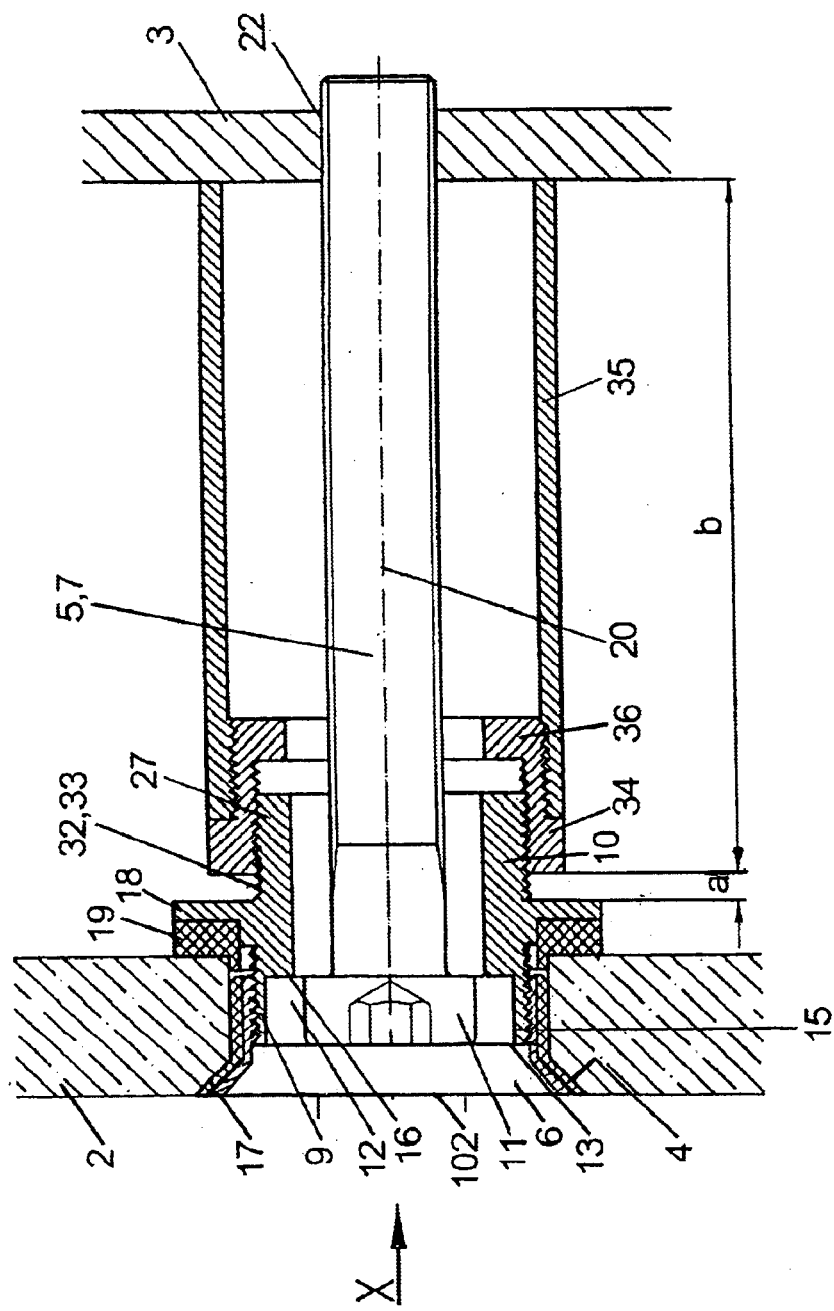
FIG. 18 shows a first embodiment of the present invention, whereby

As shown in FIG. 18, a clamping mounting is used to clamp a glass plate 2 and its attaching device to a wall 3. To this end, the glass plate 2 has a bore 4 in which bore 4 the clamping nut 6 is seated, with a clamping ring 17 between the bore 4 and the clamping nut 6. The clamping nut 6 has an internal thread 9 into which an adjusting nut 10 can be screwed. The adjusting nut 10 has a slot-like groove 15 (also see FIGS. 19 through 21) on that end facing the opening, i.e. near the end face 13 of the adjusting nut 10. There is a slot 25 (see FIGS. 19 and 20) in the floor 16 of the slot-like groove 15 through which the barrel 7 of the attachment bolt 5 passes. The circumference of the slot 15 is delimited by a support flange 21 (see FIG. 19), against which a retaining flange 11 of the barrel 7 of the attachment bolt 5 can rest. The play 12 of the barrel 7 in the slot 25 is particularly clear in FIGS. 19 through 21.

On the side of the glass plate 2 facing the wall 3, the adjusting nut 10 has a locating flange 18, between which flange 18 and the glass plate 2 and element 19 to protect the glass is located.

As shown in FIG. 18, there is an external thread 32 on that side 27 of the adjusting nut 10 opposite the slot 25, onto which a distance nut 36 with a corresponding internal thread 33 can be screwed. The distance nut 36 has a support flange 34 against which a distance bush 35 rests, the other end of which bush rests against the wall 3. The distance "a" between the distance nut 36 and the adjusting nut 10, and thus the distance "b" to the wall, can be varied via the distance nut 36 by turning the adjusting nut 10.

In at least one embodiment of the present invention, the distance "b" can be fixed due to the length of the distance bush 35. The total distance between the wall 3 and the glass plate 2 can be adjusted by or varied via the adjusting nut 10 and the distance nut 36.

Figures 19, 20, 21:
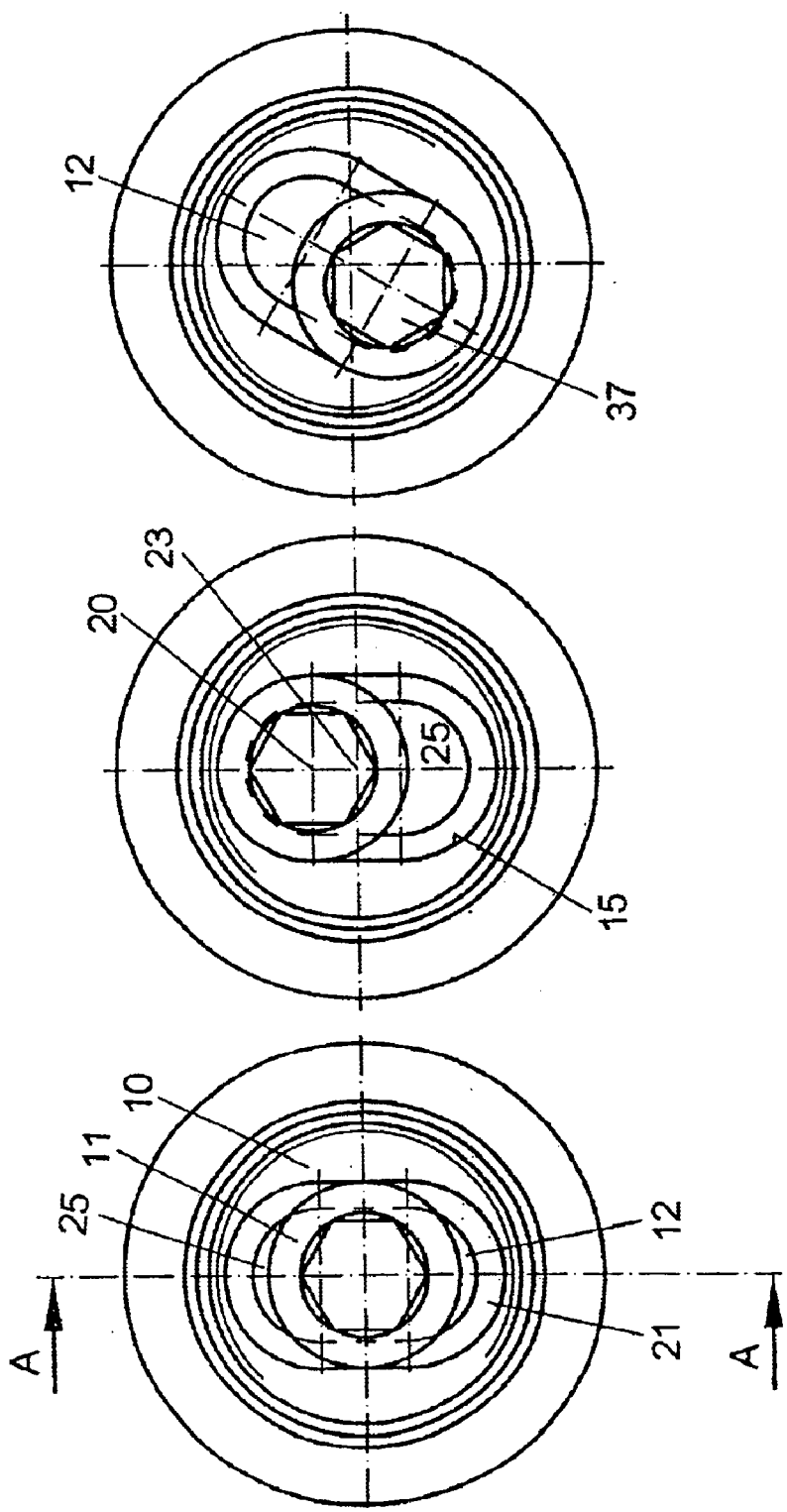
FIG. 19 shows a view of the embodiment shown in FIG. 18 in the direction of arrow X shown in FIG. 18, omitting the clamping nut.
FIG. 20 shows a view of the embodiment in FIG. 19 in a different installation position.
FIG. 21 shows a view of the embodiment in FIG. 19 in a different installation position.

As shown in FIGS. 19 and 20, the axis 20 of the attachment bolt 5 is aligned with the axis 23 of the adjusting nut 10 and thus the clamping nut 6. FIG. 20 shows a vertical deviation of the two axes 20 and 23, i.e. vertical axial displacement of the clamping nut 6 and adjusting nut 10 from the axis of the barrel 7.

FIG. 21 shows a corresponding diagonal displacement.

To further explain, FIG. 21 shows a vertical displacement similar to that of FIG. 20. The embodiment shown in FIG. 21 differs in that it can achieve an essentially diagonal displacement by combining the displacement of the adjusting nut 10 along the groove 15, with the ability of the adjusting nut 10 to be rotated, thus reorienting the groove 15 in a direction substantially diagonal with respect to the axis 20 of the bolt 5.

Figure 22:
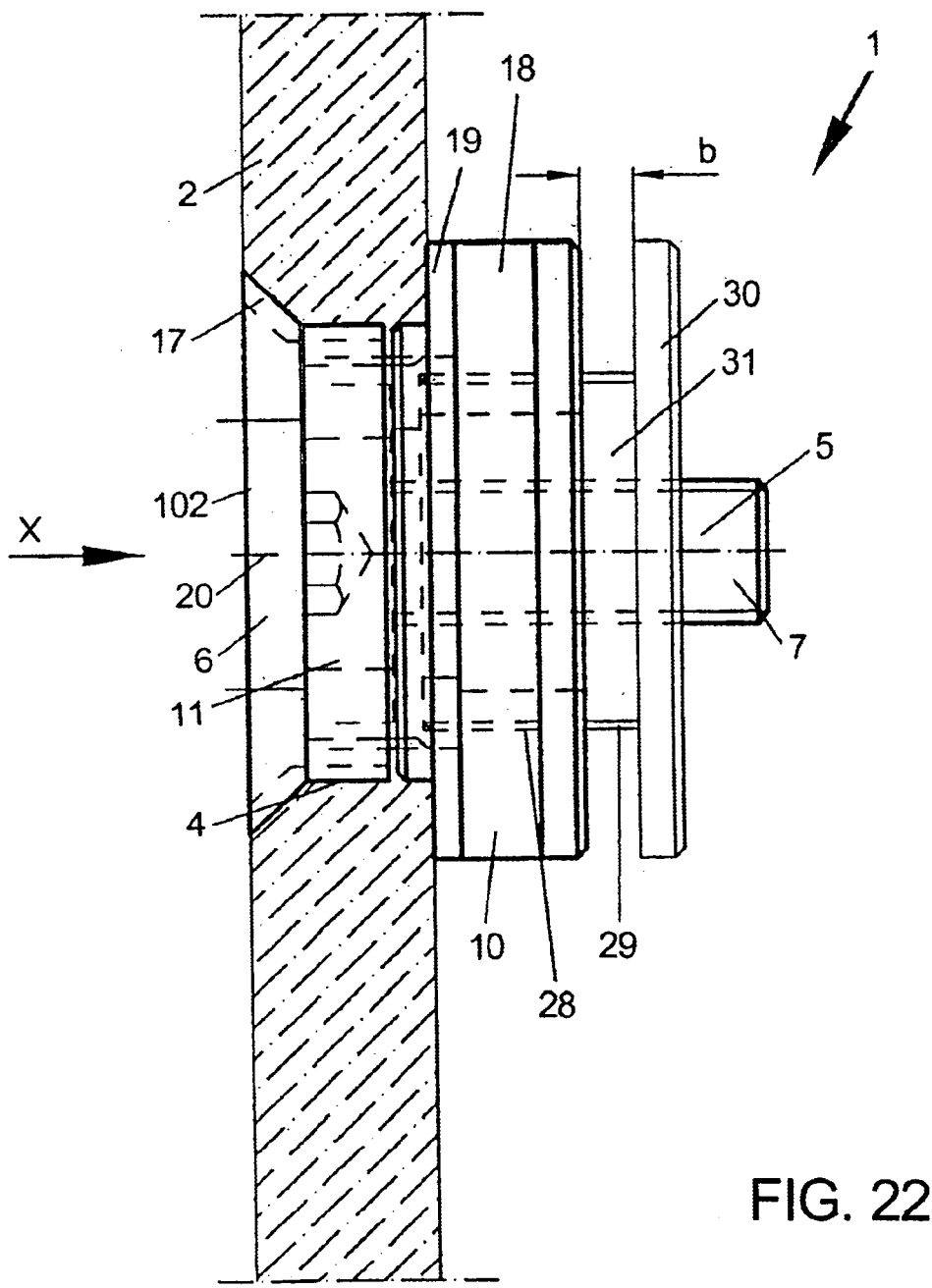
FIG. 22 shows a second embodiment of the present invention, which shows a side view of the clamping mounting in a section through the ring.
Figure 25:
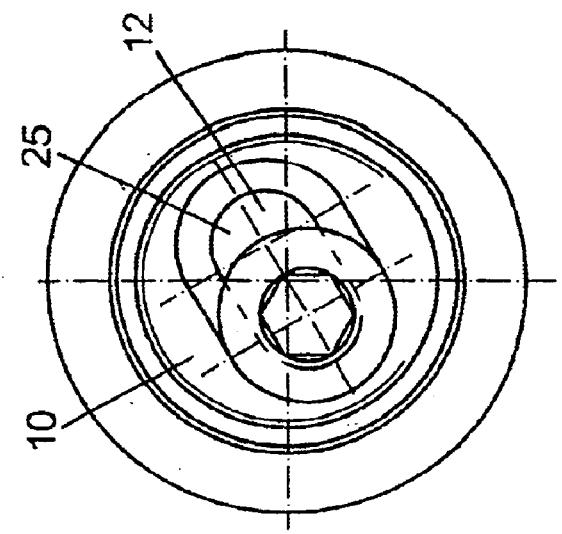
FIG. 25 shows a view of the embodiment in FIG. 23 in a different installation position.
Figure 24:
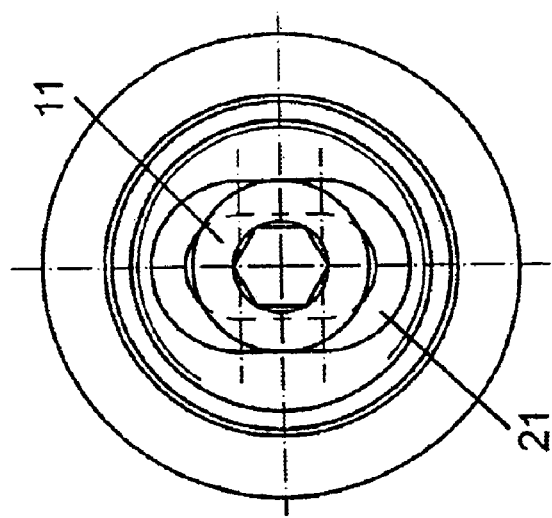
FIG. 24 shows a view of the embodiment in FIG. 23 in a different installation position.

The embodiment shown in FIG. 22 essentially differs from that shown in FIG. 18 in that the adjusting nut 10 has on that side opposite the slot-like groove 15 (see FIG. 18) an internal thread 28, into which thread 28 a distance bolt 31 having a support plate 30 on its free end and an external thread 29 can be screwed. The clamping mounting 1 can rest with this support plate 30 directly against a supporting element, e.g. a wall 3. The distance "b" between the adjusting nut 10 and the distance bolt 31 can be varied here as well.

Figure 23:
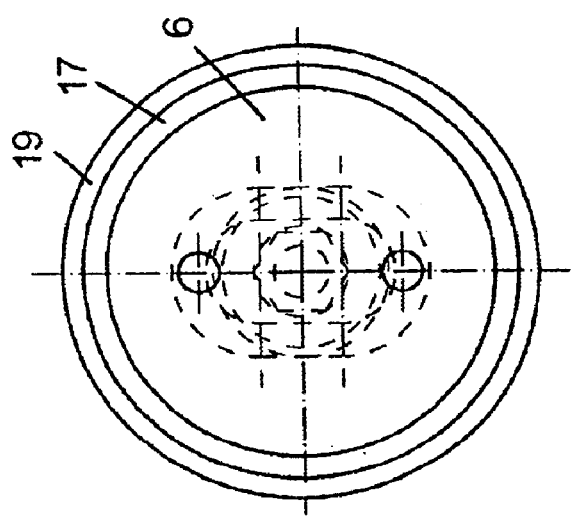
FIG. 23 shows a view of the embodiment shown in FIG. 22 in the direction of arrow X shown in FIG. 22.

FIG. 23 shows a view of the embodiment shown in FIG. 22 in the direction of arrow X. The clamping nut 6, clamping ring 17, and the glass-protecting element 19 are shown.

Similar to FIGS. 19 through 21, FIGS. 24 and 25 show a view in the direction of arrow X of various installation situations. Unlike FIG. 23, the clamping nut 6 has been omitted to show the arrangement of the support flange 21 and retaining flange 11 in FIG. 24, and the adjusting nut 10, slot 25, and play 12 in FIG. 25.

After placing the adjusting nut 10, to which the distance nut 36 is bolted, and the distance bush 35 on the barrel 7 of the attachment bolt 5, the attachment bolt 5 is screwed into a thread 22, a dowel, etc. in a wall via a hexagon socket 37 (see FIG. 21). Once an element 19 to protect the glass is put in place, the adjusting nut 10 and its associated components (distance nut 36, distance bush 35) are displaced by displacing the slot-like groove 15 relative to the barrel 7 of the attachment bolt 5 so that the axis 23 of the adjusting nut 10 and thus the axis of the clamping nut 6 is aligned with the axis of the bore 4 in the glass plate 2. The attachment bolt 5 can then be braced against the wall 3 as desired, i.e. at the desired distance to the wall using the distance nut 36. The glass plate 2 is positioned by changing the depth to which the attachment bolt 5 is screwed in on the one hand, and on the other hand by bracing the retaining flange 11 with the adjusting nut 10 via the distance nut 36, with the distance bush 35 resting against the wall 3. The glass plate 2 is fixed by bolting the clamping nut 6 down to the adjusting nut 10, with the clamping ring 17 between the two. The retaining flange 11 of the attachment bolt 5 rests against the support flange 21 of the slot-like groove.

In other words, in one embodiment of the present invention, the adjusting nut 10 can be bolted to the distance nut 36 by the corresponding threads. The distance bush 35 can then be screwed onto the distance nut 36 and adjusted for the desired distance from the wall 3. The attachment bolt 5 can then be slid through the slot 25 in the adjusting nut 10 and screwed into a thread 22, a dowel, etc. in a wall via a hexagon socket 37. Once an element 19 to protect the glass is put in place, the adjusting nut 10 and its associated components (distance nut 36, distance bush 35) can be displaced by displacing the slot-like groove 15 relative to the barrel 7 of the attachment bolt 5 so that the axis 23 of the adjusting nut 10 and thus the axis of the clamping nut 6 is aligned with the axis of the bore 4 in the glass plate 2. The attachment bolt 5 can then be braced against the wall 3 as desired, i.e. at the desired distance to the wall using the distance nut 36. The glass plate 2 is positioned by changing the depth to which the attachment bolt 5 is screwed in on the one hand, and on the other hand by bracing the retaining flange 11 with the adjusting nut 10 via the distance nut 36, with the distance bush 35 resting against the wall 3. The glass plate 2 is finally fixed by bolting the clamping nut 6 down to the adjusting nut 10, with the clamping ring 17 between the glass plate 2 and the clamping nut 6. The retaining flange 11 of the attachment bolt 5 rests against the support flange 21 of the slot-like groove.

The clamping mounting shown in FIG. 22 is installed in a similar manner.

One feature of the invention resides broadly in the clamping mounting for glass plates having an attachment bolt which passes through a bore in the glass plate and which attachment bolt has a head and a barrel, whereby the head and the barrel are realized as separate components and the barrel can be fixed to the head such that the barrel can be displaced perpendicular to the barrel axis in essentially any of the four degrees of freedom, and whereby the head comprises a conical nut located within the bore in the glass plate and an adjusting nut which can be screwed into the internal thread of the conical nut, and the head forms a basin-shaped recess for seating the barrel, which barrel has on that end inserted into the basin-shaped recess a retaining flange located between the adjusting nut and the basin bottom of the conical nut, characterized by the fact that the adjusting nut 10 has on that end face 13 facing the clamping nut 6 a slot-like groove 15 in which the retaining flange 11 of the attachment bolt 5 is seated, the floor 15 of which groove forms a support flange 21 for the retaining flange 11 and has a slot 25 which guides, and through which passes, the barrel 7 of the attachment bolt 5.

Another feature of the invention resides broadly in the clamping mounting characterized by the fact that the adjusting nut 10 has on that side 27 opposite the slot-like groove 15 some means for fixing the clamping mounting at a variable distance to a wall 3 or similar supporting element.

Yet another feature of the invention resides broadly in the clamping mounting characterized by the fact that the adjusting nut 10 has on that side 27 opposite the slot-like groove 15 an internal thread 28, into which a distance bolt 31 having a support plate 30 and a corresponding external thread can be screwed.

Still another feature of the invention resides broadly in the clamping mounting characterized by the fact that the adjusting nut 10 has on that side 27 opposite the slot-like groove 15 an external thread 32 onto which a distance nut 36 having a corresponding internal thread 33 and a support flange 34 for a distance bush 35.

Some examples of glass mountings or glass mounting devices which may possibly be utilized or adapted for use in the context of the present invention may be found in the following U.S. Pat. No. 5,323,577, issued on Jun. 28, 1994 to Whitmyer; U.S. Pat. No. 5,283,978, issued on Feb. 8, 1994 to Horgan, Jr.; U.S. Pat. No. 5,212,922, issued on May 25, 1993 to Werner; U.S. Pat. No. 4,841,697, issued on Jun. 27, 1989 to Hogg, et al.; U.S. Pat. No. 4,097,320, issued on Jun. 27, 1978 to Brauer et al.; U.S. Pat. No. 4,054,268, issued on Oct. 18, 1977 to Sher; and U.S. Pat. No. 4,016,690, issued on Apr. 12, 1997 to Richardson.

Some examples of glass facades and methods of securing glass panels of a facade which may possibly be utilized or adapted for use in the context of the present invention may be found in the following U.S. Pat. No. 5,493,831, issued on Feb. 27, 1996 to Jansson; U.S. Pat. No. 5,301,484, issued on Apr. 12, 1994 to Jansson; U.S. Pat. No. 4,837,996, issued on Jun. 13, 1989 to Eckelt; and U.S. Pat. No. 4,793,112, issued on Dec. 27, 1988 to Sufke.

The following foreign and international patent publication applications, namely, Federal Republic of Germany Patent Application No. 197 13 038.0, filed on Mar. 27, 1997, having inventor Ernst Udo Blobaum, and DE-OS 197 13 038.0 and DE-PS 197 13 038.0 and International Application No. PCT/EP98/01705, filed on Mar. 24, 1998, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Figure 26:
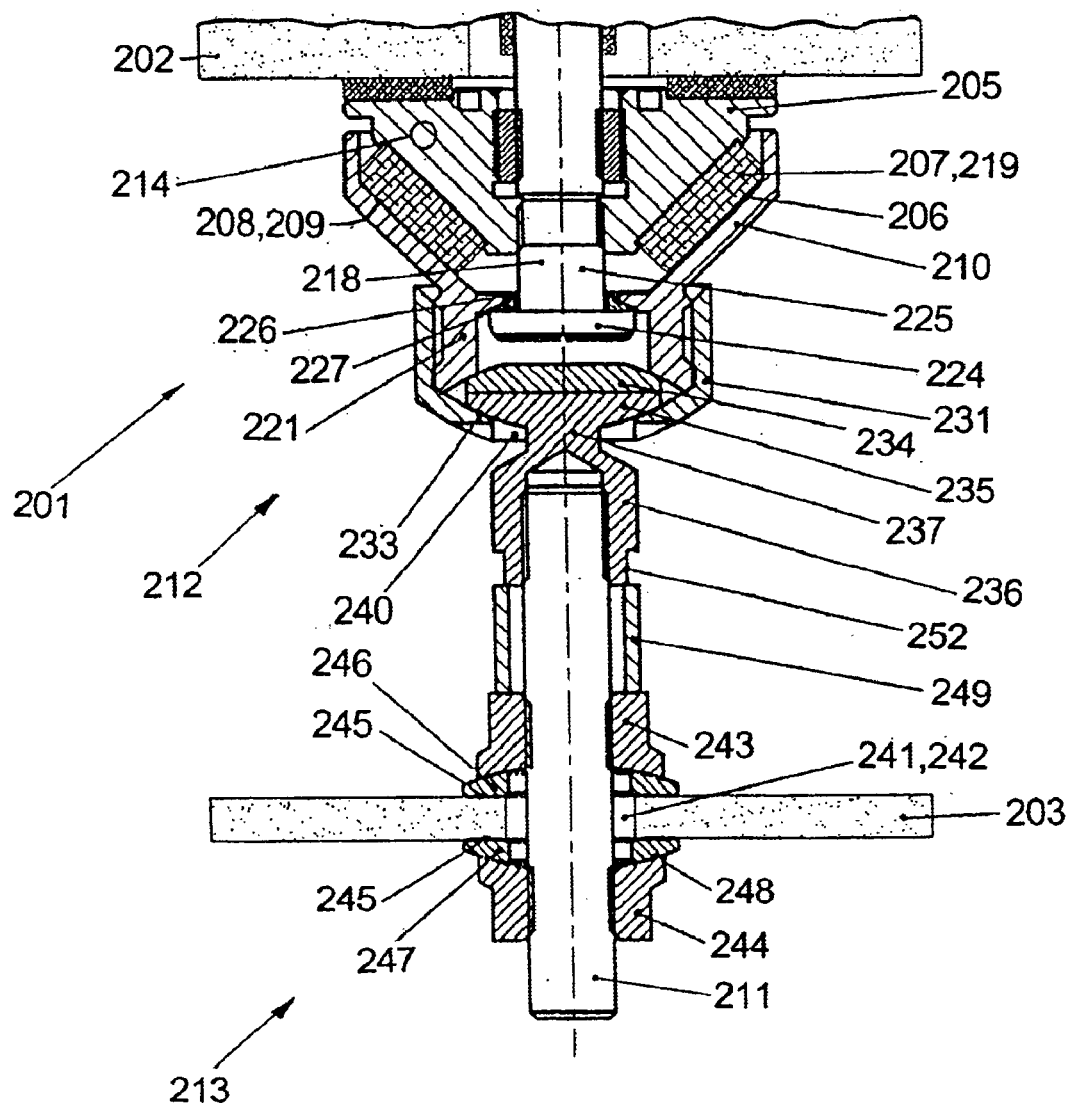
FIG. 26 is a cross-sectional view of a fastening assembly.

At least one additional possible embodiment of the invention will be described in more detail with reference to the following figure, wherein FIG. 26 is a cross-sectional view of a fastening assembly.

In accordance with FIG. 26, a fastening assembly 201 has a first clamp element 205 and a second clamp element (not shown), between which is clamped a glass pane 202. The protection of the glass which is arranged in known manner and is evident from the drawing is not further identified. The interiorly disposed first clamp element 205 of this embodiment has a conical mantle surface area 214, at which is in contact a permanently elastic spring member which is configured as permanently elastic pillow 219 and which is supported at a projecting portion. The elastic spring member, accordingly, in practical manner provides the actual mantle surface area 206 of the first clamp element 205. An interior mantle surface 209 of a bell-shaped housing is in contact with a complementing surface 208 at the mantle surface area 206. The through bore has an inner screw threading. Into this inner screw threading extends an adjustment screw 218 for the bell-shaped housing, and the head 224 of the screw is supported at a flange of a cylindrical extension 221 of the bell-shaped housing 210. Between the flange and the screw head 224 there is provided a lens-shaped spacer 227 which, preferably, is comprised of an elastic material of construction, which spacer 227 is supported at a support surface of the flange, such that at this location there is realized a pivot joint having a free motion portion 226. For this, the lens-shaped spacer 227 has a complementing surface. The cylindrical extension 221 of the bell-shaped housing 210, which extension extends from the bottom region, has an interior forward surface which is directed towards the building-side holding device 203 and which is of concave configuration. A correspondingly oppositely configured curvature is provided by an interior bottom wall of a bell-shaped nut 231, such that two lens-shaped spacers 234 and 235 can be disposed between the concave surface of the cylindrical extension 221 and a bottom wall of the bell-shaped nut 231; these two lens-shaped spacers 234 and 235 have planar surfaces 233 which are in contact with one another, and of which a loose lens-shaped spacer 234 is in contact with its forward surface at the concave surface of the cylindrical extension 221, while the second lens-shaped spacer 235 is a unitary component of a nut 236 which engages a securement screw 211 and on the other hand is supported with its convex surface at the bottom wall. The nut 236 has a shaft 237 which extends through a bore in the bell-shaped nut 231 with a play or motion permitting formation 240 being present.

FIG. 26 illustrates that on threadingly fastening the bell-shaped nut 231 onto the bell-shaped housing 210, by way of an outer screw threading in the region of the cylindrical extension 221 there can be realized a rigid connection of a pivot joint, or articulated support, which is generally identified by reference numeral 212, which is provided by the lens-shaped spacers 234 and 235, and which can be locked in place in the adjusted position. The nut 236 has a pocket or blind hole or bore with an inner screw threading into which can be threadingly inserted the securement screw 211, whereby at the outer mantle surface of the nut 236 there are provided surfaces or formations 252 for applying a wrench. FIG. 26 furthermore illustrates that in this embodiment of the invention a spacer sleeve 249 is next to the nut 236, and this spacer sleeve 249 is supported on a nut 243 which secures the building-side holding device 203. Between the nut 243 and a locknut 244 are provided lens-shaped spacers 246 and 247 which are in contact, respectively, on complementing surfaces 248 of the nut 243 and the locknut 244. Planar surfaces 245 of the lens-shaped spacers 246 and 247 are directly in contact with the building-side holding device 203. Since a securement screw 211 extends through a bore 241 of the holding device 203, with free play or a free motion formation 242, again here is realized a pivot joint, or articulated support, generally identified by reference numeral 213. This provides for adjustment of tolerances due to configuration.

Thus, the fastening assembly described in the foregoing is of use to maintain the elasticity of the glass panes 202, since it does not restrict movement of such panes and, accordingly, leads to a neutralization of forces. The fastening assembly in accordance with the invention has the capability to adapt to the adjacent requirements, and not a rigidity of the material of construction of glass, which necessarily would lead to a destruction, as is the result in the mentioned prior art.

For any type of installation of glass panes supported at a point, exteriorly or interiorly, the fastening assembly serves to attain a tension-free arrangement and affords a tension-free and continuous use.

The term pivot joint is to mean an angle adjustment arrangement to provide connection which can allow substantially multi-directional movement in a free condition of assembly and the joint can be locked in position upon final assembly of the components of the clamping arrangement.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 100 20 292.6, filed on Apr. 26, 2000, having inventor Hubert ELMER, and DE-OS 100 20 292.6, and DE-PS 100 20 292.6; Federal Republic of Germany Patent Application No. 101 01 517.8, filed on Jan. 12, 2001, having inventor Hubert ELMER, and DE-OS 101 01 517.8, and DE-PS 101 01 517.8; and International Application No. PCT/EP01/04255, filed on Apr. 12, 2001, having inventor Hubert ELMER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The following U.S. Patents are incorporated by reference as if set forth in their entirety herein, as follows: U.S. Pat. No. 6,254,397, issued on Jul. 3, 2001 to inventor Hubert ELMER; U.S. Pat. No. 6,131,346, issued on Oct. 17, 2000 to inventor Herbert KORDES; and U.S. Pat. No. 6,158,177, issued on Dec. 12, 2000 to inventor Ernst Udo BLOBAUM.

The following U.S. Patent Applications are incorporated by reference as if set forth in their entirety herein, as follows: Ser. No. 09/862,031, filed on May 18, 2001, having applicant Hubert ELMER; Ser. No. 09/861,458, filed on May 18, 2001, having applicant Hubert ELMER; Ser. No. 09/838, 349, filed on Apr. 19, 2001, having applicant Lothar GINZEL; Ser. No. 09/835,865, filed on Apr. 16, 2001, having applicants Ralf KREYENBORG and Dirk SCHULTE; Ser. No. 09/854,411, filed on May 11, 2001, having applicant Hubert ELMER; Ser. No. 09/731,265, filed on Dec. 6, 2000, having applicants Ernst Udo BLOBAUM and Reinhard JANUTTA; and Ser. No. 09/730,083, filed on Dec. 5, 2000, having applicants Hubert ELMER and Peter LEITGEB.

Some examples of glass facades and methods of securing glass panels of a facade which may possibly be utilized or adapted for use in the context of the present invention may be found in the following U.S. Pat. No. 5,791,105, issued on Aug. 11, 1998 to Gangi; U.S. Pat. No. 5,524,404, issued on Jun. 11, 1996 to Lahaye; U.S. Pat. No. 5,493,831, issued on Feb. 27, 1996 to Jansson; U.S. Pat. No. 5,373,672, issued on Dec. 20, 1994 to Schulz; U.S. Pat. No. 5,301,484, issued on Apr. 12, 1994 to Jansson; U.S. Pat. No. 5,184,440, issued on Feb. 9, 1993 to Felix, et al.; U.S. Pat. No. 5,069,014, issued on Dec. 3, 1991 to Kubbutat; U.S. Pat. No. 4,837,996, issued on Jun. 13, 1989 to Eckelt; and U.S. Pat. No. 4,793,112, issued on Dec. 27, 1988 to Sufke.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

Least Partial Nomenclature
101 Clamping element
102 Cover
103 Conical nut
104 Pot bottom
105 Central boring
106 Slot
107 Conical flange
108 Flat panel
109 Fastening bolt
110 Flange of the pot bottom
111 Clip connection
112 Bolt head
113 Clip connector
114 Clip connector
115 Radially encircling outside groove
116 Elastic ring
117 Circlip
118 Ring segments connected at an angle to one another
119 Undercut groove
120 Encircling projection

What is claimed is:

1. A glass pane arrangement comprising a glass pane and a clamp fitting for fastening the glass pane, the clamp fitting comprising two clamping elements that clamp the glass pane between them, whereby one clamping element is realized in the form of a conical nut that is set into a boring of the glass pane, which nut is covered on the outside of the glass pane by a cover which is flush with the outside of the glass pane, which cover is detachably connected with the conical nut by means of a clip connector which is located on the cover, wherein the clip connector is one of: integrated into the cover and integral with the cover, and wherein the clip connector comprises an elastic portion to detachably connect the cover to the conical nut; and said elastic portion comprises an elastic ring located in a radially encircling outer groove of the cover, the outside diameter of which elastic ring is slightly greater than the outside diameter of the cover.

2. The glass pane arrangement as claimed in claim 1, wherein the elastic ring is realized in the form of a circlip.

3. The glass pane arrangement as claimed in claim 2, wherein the elastic ring consists of a plurality of straight ring segments that are connected at an angle with respect to one another.

4. The glass pane arrangement as claimed in claim 3, wherein the elastic ring is realized in the form of an O-ring.

5. The glass pane arrangement as claimed in claim 4, wherein in the conical nut there is an undercut groove that receives the elastic ring.

6. The glass pane arrangement as claimed in claim 5, wherein:

the conical nut is realized in the shape of a pot and one of: a central boring and a slot is located in the bottom of the pot; and the cover is realized in the form of a flat disc made of steel or plastic.

7. A glass pane arrangement comprising a glass pane and a clamp fitting for fastening the glass pane, the clamp fitting comprising two clamping elements that clamp the glass pane between them, whereby one clamping element is realized in the form of a conical nut that is set into a boring of the glass pane, which nut is covered on the outside of the glass pane by a cover which is flush with the outside of the glass pane, which cover is detachably connected with the conical nut by means of a clip connector which is located on the cover, wherein the clip connector is one of: integrated into the cover and integral with the cover, and wherein the clip connector comprises an elastic portion to detachably connect the cover to the conical nut;

the conical nut comprises an undercut groove;

said elastic portion comprises a plurality of projections on the outside periphery of the cover that are shaped onto the cover and are complementary to the undercut groove of the conical nut;

the conical nut is realized in the shape of a pot and one of: a central boring and a slot is located in the bottom of the pot; and the cover is realized in the form of a flat disc made of plastic.

* * * * *

UNITED STATES PATENT AND TRADEMARK OFFICE
CERTIFICATE OF CORRECTION

PATENT NO.    : 6,796,091 B2
DATED         : September 28, 2004
INVENTOR(S)   : Hubert Elmer It is certified that error appears in the above-identified patent and that said Letters Patent is hereby corrected as shown below:

Column 5,
Line 19, after "of the clamping" insert -- element with the fastening bolt; --.

Column 7,
Line 51, after "slot", delete "(108)" and insert -- (106) --.

Signed and Sealed this

Fifth Day of April 2005

JON W. DUDAS
*Director of the United States Patent and Trademark Office*